US011048403B2

(12) United States Patent
Wang et al.

(10) Patent No.: US 11,048,403 B2
(45) Date of Patent: Jun. 29, 2021

(54) METHOD AND DEVICE FOR ANIMATING GRAPHIC SYMBOL FOR INDICATION OF DATA TRANSMISSION

(71) Applicant: TENCENT TECHNOLOGY (SHENZHEN) COMPANY LIMITED, Shenzhen (CN)

(72) Inventors: Qian Wang, Shenzhen (CN); Wei Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 115 days.

(21) Appl. No.: 15/972,839

(22) Filed: May 7, 2018

(65) Prior Publication Data

US 2018/0253207 A1 Sep. 6, 2018

Related U.S. Application Data

(63) Continuation of application No. PCT/CN2017/071825, filed on Jan. 20, 2017.

(30) Foreign Application Priority Data

Jan. 29, 2016 (CN) .......................... 201610067069.5

(51) Int. Cl.
*G06F 3/0486* (2013.01)
*H04L 29/08* (2006.01)
(Continued)

(52) U.S. Cl.
CPC ........ *G06F 3/0486* (2013.01); *G06F 3/04883* (2013.01); *H04L 29/08* (2013.01);
(Continued)

(58) Field of Classification Search
CPC ............... G06F 3/0486; G06F 3/04883; G06F 2203/04803; H04L 29/08; H04L 67/12; H04L 67/18
See application file for complete search history.

(56) References Cited

U.S. PATENT DOCUMENTS 7,086,011 B2 * 8/2006 Budrys ............... G06F 3/04817
715/762
7,636,794 B2 12/2009 Ramos et al.
(Continued)

FOREIGN PATENT DOCUMENTS

CN 102685175 9/2012
CN 103944934 7/2014
(Continued)

OTHER PUBLICATIONS

A. Simeone, "A Cross Device Drag-And-Drop Technique," YouTube video, published Dec. 7, 2013, downloaded from https://www.youtube.com/watch?v=wt3px6RABTI (Year: 2013).*
(Continued)

*Primary Examiner* — Eric J Yoon
(74) *Attorney, Agent, or Firm* — Oblon, McClelland, Maier & Neustadt, L.L.P.

(57) ABSTRACT

This application discloses a data transmission/reception method and apparatus, and belongs to the field of in-vehicle technologies. Aspects of the disclosure provide a method for data transmission. The method includes generating, by processing circuitry of a source device for data transmission, a graphical symbol representing data to be transmitted, displaying the graphical symbol on a display screen of the source device and detecting a specific operation on the graphical symbol that is displayed on the display screen. The specific operation is indicative of an instruction to transmit the data to a target device. The method further includes determining a moving direction of the graphical symbol
(Continued)

according to the specific operation, transmitting the data to the target device and animating the graphical symbol to leave the display screen of the source device in the moving direction to indicate the data transmission.

17 Claims, 8 Drawing Sheets (51) Int. Cl.
*G06F 3/0488* (2013.01)
*B60R 11/02* (2006.01)
*G06T 13/80* (2011.01)

(52) U.S. Cl.
CPC .............. *H04L 67/12* (2013.01); *H04L 67/18* (2013.01); *B60R 11/0264* (2013.01); *B60Y 2400/92* (2013.01); *G06T 13/80* (2013.01); *Y02P 90/02* (2015.11)

(56) References Cited

U.S. PATENT DOCUMENTS

| 9,386,435 | B2 | 7/2016 | Wang | |
|---|---|---|---|---|
| 2009/0199275 | A1* | 8/2009 | Brock | G06F 3/04815 726/4 |
| 2010/0095249 | A1* | 4/2010 | Yoshikawa | A63F 13/211 715/856 |
| 2012/0235926 | A1 | 9/2012 | Sip | |
| 2013/0050277 | A1* | 2/2013 | Wang | G06F 3/0486 345/676 |
| 2015/0228146 | A1* | 8/2015 | Hightower | G07F 17/3272 463/31 |
| 2015/0365306 | A1* | 12/2015 | Chaudhri | G06F 3/0416 715/736 |
| 2017/0052685 | A1* | 2/2017 | Kovacs | G06F 3/0484 |

FOREIGN PATENT DOCUMENTS

| CN | 104484144 | 4/2015 |
|---|---|---|
| CN | 105681441 | 6/2016 |

OTHER PUBLICATIONS

A. Simeone, "A Cross Device Drag-And-Drop Technique," YouTube video, various snapshots, published Dec. 7, 2013, downloaded from https://www.youtube.com/watch?v=wt3px6RABTI (Year: 2013).*

MathGuide website, "Flight of a Projectile," dated by waybackmachine. org as Mar. 1, 2015, downloaded from http://web.archive.org/web/20150301012340/http://www.mathguide.com/lessons2/FlightProjectile.html (Year: 2015).*

International Search Report dated Apr. 7, 2017 in PCT/CN2017/071825 filed Jan. 20, 2017. (With English Translation).

* cited by examiner

METHOD AND DEVICE FOR ANIMATING GRAPHIC SYMBOL FOR INDICATION OF DATA TRANSMISSION

RELATED APPLICATION

This application is a continuation of International Application No. PCT/CN2017/071825, filed on Jan. 20, 2017, which claims priority to Chinese Patent Application No. 201610067069.5, filed with the Chinese Patent Office on Jan. 29, 2016 and entitled "DATA TRANSMISSION METHOD AND APPARATUS". The entire disclosures of the prior applications are hereby incorporated by reference in their entirety.

FIELD OF THE TECHNOLOGY

This application relates to the field of in-vehicle technologies, and in particular, to a data transmission/reception method and apparatus.

BACKGROUND OF THE DISCLOSURE

With development of an in-vehicle technology, functions of an in-vehicle control system are becoming more extensive. A user can use the in-vehicle control system to control use of parts in a vehicle. The in-vehicle control system is already not limited to controlling the functions in the vehicle, and data transmission may be performed between the in-vehicle control system and a terminal such as a smartphone. For example, the smartphone may transmit an audio file to the in-vehicle control system, so that the in-vehicle control system can play audio. The foregoing process of data transmission between the terminal and the in-vehicle control system is generally performed in the background on the terminal and the in-vehicle control system. For the user, any information about the transmission process cannot be obtained, and this transmission manner is not intuitive. Therefore, a relatively intuitive method of data transmission between the vehicle and the smartphone is urgently needed.

SUMMARY

To resolve a problem in the existing technology, embodiments of this application provide a data transmission/reception method and apparatus.

Aspects of the disclosure provide a method for data transmission. The method includes generating, by processing circuitry of a source device for data transmission, a graphical symbol representing data to be transmitted, displaying the graphical symbol on a display screen of the source device and detecting a specific operation on the graphical symbol that is displayed on the display screen. The specific operation is indicative of an instruction to transmit the data to a target device. The method further includes determining a moving direction of the graphical symbol according to the specific operation, transmitting the data to the target device and animating the graphical symbol to leave the display screen of the source device in the moving direction to indicate the data transmission. In an example, the method includes transmitting the data to the target device to cause the target device, in response to a reception of the data, to animate another graphical symbol entering a display screen of the target device.

To generate, at the source device for the data transmission, the graphical symbol representing the data to be transmitted, in an embodiment, the method includes generating the graphical symbol with a shape that is indicative of a data type of the data. In another embodiment, the method includes generating the graphical symbol with a color that is indicative of the data type of the data.

To detect the specific operation on the graphical symbol that is displayed on the display screen, in an embodiment, the method includes detecting a drag operation on the graphical symbol with a touch point moving to a position that is within a preset distance to an edge of the display screen. In another embodiment, the method includes detecting a sliding operation on the graphical symbol with a touch point sliding at a speed that is greater than a preset speed.

To animate the graphical symbol to leave the display screen of the source device in the moving direction to indicate the data transmission, in an embodiment, the method includes obtaining virtual screens according to screen sizes of the source device and the target device. The virtual screens include a first virtual screen corresponding to the display screen of the source device and a second virtual screen corresponding to a display screen of the target device. Then, the method includes determining a moving track of the graphical symbol according to the virtual screens, and displaying, according to the moving track of the graphical symbol, an animation of the graphical symbol that leaves the display screen of the source device. Further, the method includes transmitting a signal to the target device to cause the target device to cooperate with the source device and display an animation of a second graphical symbol entering the display screen of the target device according to the virtual screens.

In some embodiments, the graphical symbol includes multiple card images respectively corresponding to multiple data pieces in the data. Then, to animate the graphical symbol to leave the display screen of the source device in the moving direction to indicate the data transmission, the method includes animating the multiple card images to leave the display screen of the source device in a sequence corresponding to a data transmission sequence of the multiple data pieces.

In some embodiments, to animate the graphical symbol to leave the display screen of the source device in the moving direction to indicate the data transmission, the method includes displaying a portion of the graphical symbol on the display screen of the source device. The portion is complementary to a partial display of the graphical symbol on a display screen of the target device.

Aspects of the disclosure provide a method for data reception. The method includes receiving, by processing circuitry of a target device of data reception, data sent by a source device, obtaining a graphical symbol representing the data, determining a location relationship between the source device and the target device, determining a moving direction of the graphical symbol according to the location relationship, and animating the graphical symbol entering a display screen of the target device in the moving direction to indicate a reception of the data.

To obtain the graphical symbol representing the data, in an embodiment, the method includes generating the graphical symbol according to a data type of the data. In another embodiment, the method includes receiving symbol information sent by the source device, and generating the graphical symbol according to the symbol information.

To animate the graphical symbol entering the display screen of the target device in the moving direction to indicate the reception of the data, the method includes obtaining virtual screens according to screen sizes of the source device and the target device. The virtual screens include a first virtual screen corresponding to a display screen of the source device and a second virtual screen corresponding to the display screen of the target device. The method further includes determining a moving track of the graphical symbol according to the virtual screens and animating the graphical symbol entering the display screen of the target device according to the moving track.

In an embodiment, the method includes receiving data sent by multiple source devices, and animating multiple graphical symbols entering the display screen of target device and arriving at a specific location of the display screen in a display sequence corresponding to a data reception sequence of the data from the multiple source devices.

According to an aspect of the disclosure, the method includes displaying a real-time transmission progress when an amount of the data is greater than a preset threshold.

To animate the graphical symbol entering the display screen of the target device in the moving direction to indicate the reception of the data, in an example, the method includes displaying a portion of the graphical symbol on the display screen of the target device. The portion is complementary to a partial display of the graphical symbol on a display screen of the source device.

Aspects of the disclosure provide an apparatus that includes interface circuitry, transmitting circuitry, and processing circuitry. The interface circuitry is configured to display images on a display screen and detect operations on the display images. The transmitting circuitry is configured to transmit signals carrying data. The processing circuitry is configured to generate a graphical symbol representing data to be transmitted, display the graphical symbol on the display screen via the interface circuitry, and detect a specific operation on the graphical symbol via the interface circuitry. The specific operation is indicative of an instruction to transmit the data to a target apparatus. The processing circuitry is further configured to determine a moving direction of the graphical symbol according to the specific operation, transmit the data to the target apparatus via the transmitting circuitry and animate the graphical symbol to leave the display screen in the moving direction to indicate the data transmission.

Aspects of the disclosure also provide an apparatus that includes display circuitry, receiving circuitry and processing circuitry. The display circuitry is configured to display images on a display screen. The receiving circuitry is configured to receive signals carrying data that is sent by a source apparatus. The processing circuitry is configured to obtain a graphical symbol representing the data, determine a location relationship between the source apparatus and the apparatus, determine a moving direction of the graphical symbol according to the location relationship, and animate the graphical symbol entering the display screen in the moving direction to indicate a reception of the data.

BRIEF DESCRIPTION OF THE DRAWINGS

To describe the technical solutions of the embodiments of this application more clearly, the following briefly introduces the accompanying drawings required for describing the embodiments. The accompanying drawings in the following description show only some embodiments of this application, and a person of ordinary skill in the art may still derive other drawings from these accompanying drawings.

DESCRIPTION OF EMBODIMENTS

To make the objectives, technical solutions, and advantages of this application clearer, the following further describes the implementations of this application in detail with reference to the accompanying drawings.

Figure 1:
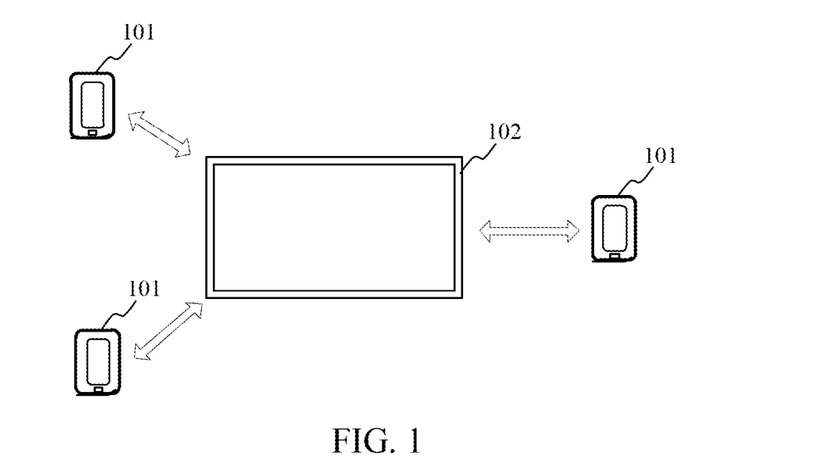
FIG. 1 is a structural diagram of an implementation scenario according to an embodiment of this application.

FIG. 1 is a structural diagram of an implementation scenario according to an embodiment of this application. Referring to FIG. 1, the implementation environment includes multiple terminal devices 101 and an in-vehicle device 102. The multiple terminal devices 101 may separately establish a data connection to the in-vehicle device 102, to perform data transmission. Using an example in which a terminal device 101 has established a data connection to the in-vehicle device 102, the terminal device 101 may be referred to as a source device, and the in-vehicle device 102 may be referred to as a target device. Certainly, herein that the terminal device 101 sends data to the in-vehicle device 102 is an example. When the in-vehicle device 102 sends data to the terminal device 101, the devices are named vice versa.

Figure 2:
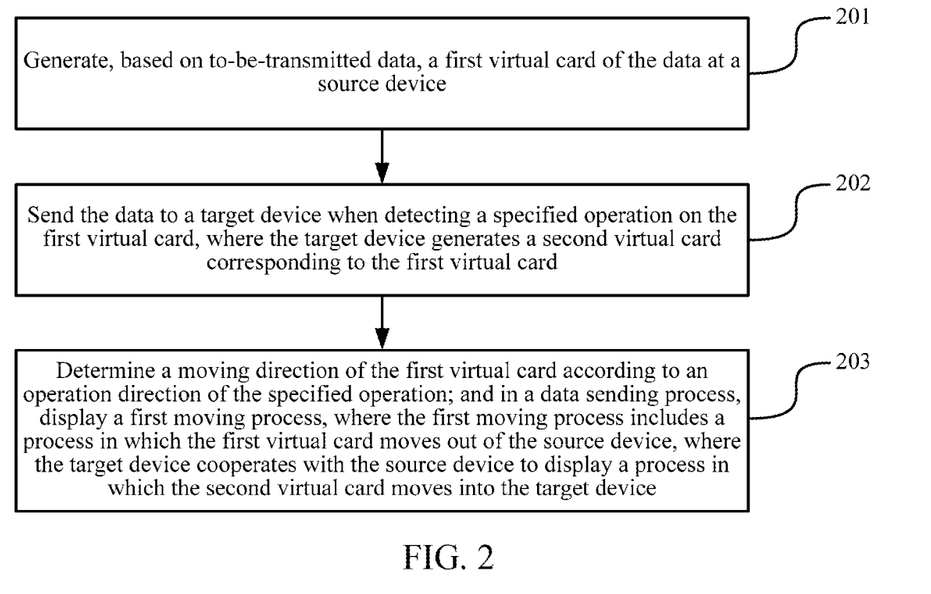
FIG. 2 is a flowchart of a data transmission method according to an embodiment of this application.

FIG. 2 is a flowchart of a data transmission method according to an embodiment of this application. Referring to FIG. 2, the method is applied to a source device. The method includes:

201: Generate, based on to-be-transmitted data, a first virtual card of the data.

202: Send the data to a target device when detecting a specified operation on the first virtual card, where the target device generates a second virtual card corresponding to the first virtual card.

203: Determine a moving direction of the first virtual card according to an operation direction of the specified operation; and in a data sending process, display a first moving process, where the first moving process includes a process in which the first virtual card moves out of the source device, where the target device cooperates with the source device to display a process in which the second virtual card moves into the target device.

According to the method provided in this embodiment of this application, in a data transmission process, for a source device and a target device, a process in which a virtual card used for representing data flies out of a device is displayed at one end, and a process in which a virtual card enters a device is displayed in a matching and complementation manner at the other end, so that a data transmission process is veritably reflected in a continuous display manner, greatly enhancing intuition of data transmission.

In a possible implementation, the generating, based on to-be-transmitted data, a first virtual card of the data includes: generating, according to a data type of the to-be-transmitted data, a first virtual card of a shape corresponding to the data type, where different data types correspond to different shapes; or generating, according to a data type of the to-be-transmitted data, a first virtual card of a color corresponding to the data type, where different data types correspond to different colors; or generating, according to a data type of the to-be-transmitted data, a first virtual card of a shape and a color corresponding to the data type, where different data types correspond to different shapes and different colors.

In a possible implementation, the sending the data to a target device when detecting a specified operation on the first virtual card includes: when detecting a drag operation on the first virtual card, if a distance between a touch point of the drag operation and a screen edge of the source device continuously decreases and the distance is less than a preset distance, sending the data to the target device; or when detecting a sliding operation on the first virtual card, if a distance between a touch point of the sliding operation and a screen edge of the source device continuously decreases and a sliding speed is greater than a preset speed, sending the data to the target device.

In a possible implementation, the displaying a first moving process includes:

obtaining a virtual screen according to screen sizes of the source device and the target device, where the virtual screen includes a screen of the source device and a screen of the target device;

determining moving tracks that are of the first virtual card and the second virtual card and that are on the virtual screen; and displaying, according to the moving track of the first virtual card, the process in which the first virtual card moves out of the source device, where the target device cooperates with the source device according to the moving track of the second virtual card to display the process in which the second virtual card moves into the target device.

In a possible implementation, when the to-be-transmitted data is multiple pieces of data, the generated first virtual card includes multiple first virtual cards of the multiple pieces of data; and the in a data sending process, displaying a first moving process includes: in the data sending process, displaying a process in which the multiple first virtual cards of the multiple pieces of data move out of the source device according to a data sending sequence.

All optional technical solutions above may be combined in any manner to form optional embodiments of the present disclosure. Details are not further described herein one by one.

Figure 3:
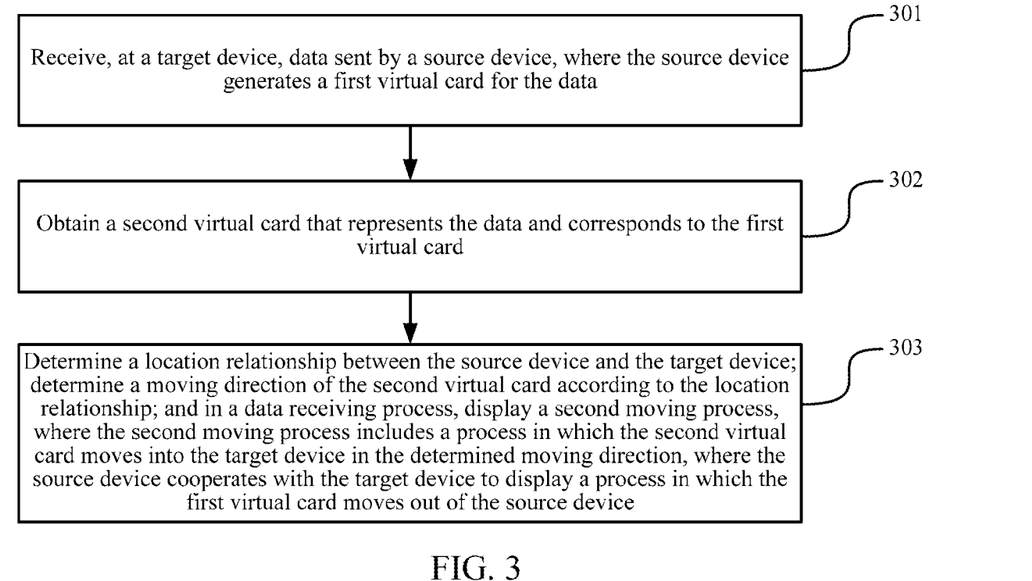
FIG. 3 is a flowchart of a data transmission method according to an embodiment of this application.

FIG. 3 is a flowchart of a data transmission method according to an embodiment of this application. Referring to FIG. 3, the method is applied to a target device. The method includes:

301: Receive data sent by a source device, where the source device generates a first virtual card for the data.

302: Obtain a second virtual card that represents the data and corresponds to the first virtual card.

303: Determine a location relationship between the source device and the target device; determine a moving direction of the second virtual card according to the location relationship; and in a data receiving process, display a second moving process, where the second moving process includes a process in which the second virtual card moves into the target device in the determined moving direction, where the source device cooperates with the target device to display a process in which the first virtual card moves out of the source device.

According to the method provided in this embodiment of this application, in a data transmission process, for a source device and a target device, a process in which a virtual card used for representing data flies out of a device is displayed at one end, and a process in which a virtual card enters a device is displayed in a matching and complementation manner at the other end, so that a data transmission process is veritably reflected in a continuous display manner, greatly enhancing intuition of data transmission.

In a possible implementation, the obtaining a second virtual card of the data includes: generating the second virtual card of the data according to a data type of the data; or receiving virtual card information that is of the first virtual card and that is sent by the source device, and generating the second virtual card of the data according to the virtual card information.

In a possible implementation, the displaying a second moving process includes: obtaining a virtual screen according to screen sizes of the source device and the target device, where the virtual screen includes a screen of the source device and a screen of the target device;

determining moving tracks that are of the first virtual card and the second virtual card and that are on the virtual screen; and displaying, according to the moving track of the second virtual card, the process in which the second virtual card moves into the target device, where the source device cooperates with the target device according to the moving track of the first virtual card to display the process in which the first virtual card moves out of the source device.

In a possible implementation, in a data receiving process, displaying a second moving process includes: when receiving data sent by multiple source devices, displaying, according to a receiving sequence, a process in which multiple second virtual cards move into a display interface of the target device and move to a specified location on the display interface of the target device.

In a possible implementation, the in a data receiving process, displaying a second moving process includes: if an amount of the data is greater than a preset threshold, displaying that the second virtual card moves into a display interface of the target device and moves to a specified location on the display interface of the target device, and displaying the second virtual card and real-time transmission progress of data at the specified location.

All optional technical solutions above may be combined in any manner to form optional embodiments of the present disclosure. Details are not further described herein one by one.

Figure 4:
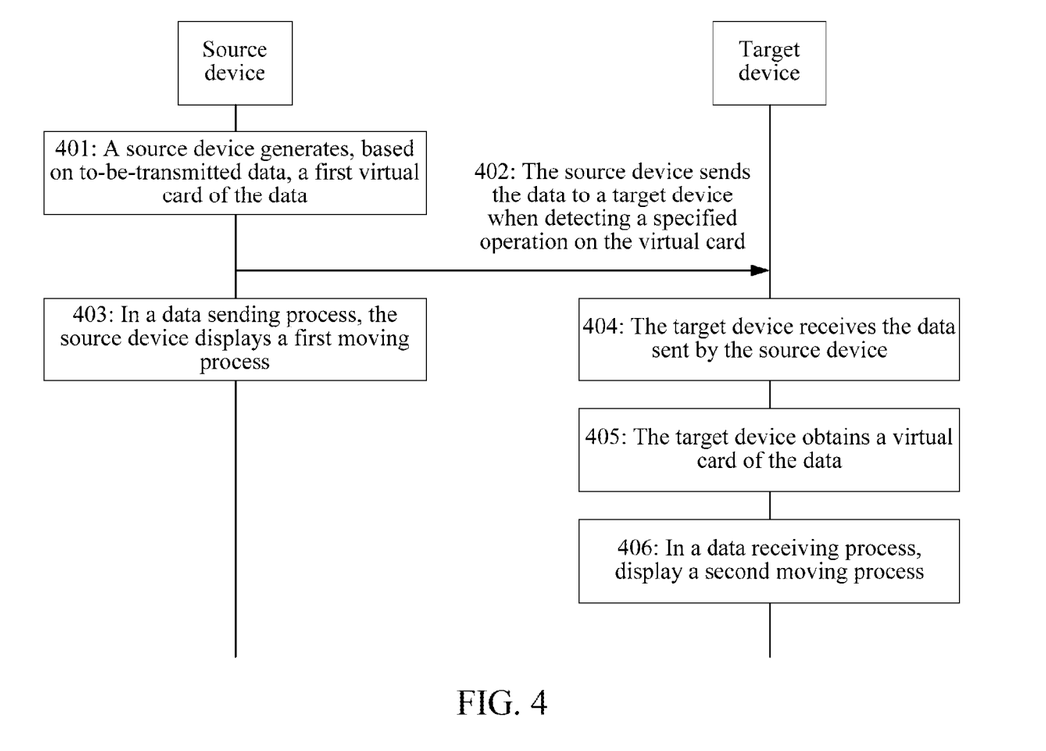
FIG. 4 is a flowchart of a data transmission method according to an embodiment of this application.

FIG. 4 is a flowchart of a data transmission method according to an embodiment of this application. Referring to FIG. 4, in the embodiment, descriptions are provided by using an example in which a source device sends data and a target device receives the data. The method specifically includes the following operations:

401: The source device generates, based on to-be-transmitted data, a first virtual card of the data.

The virtual card includes a data name. Certainly, the virtual card may further include other data information such as a data type. There may be multiple types of to-be-transmitted data, such as a video file, an audio file, and a text document. For different types of data, the source device may generate different forms of virtual cards, and the different forms mean any display element in a shape and a color, and the like. For example, for the audio file, a virtual card in a shape of an envelope may be generated, and a musical note is displayed on a surface of the envelope; for the video file, a virtual card in a shape of an envelope may be generated, and a playing symbol used for indicating playing is displayed on a surface of the envelope, and a color of the virtual card may also vary according to different data types. Specifically, the generated process may include any one of the following manners:

First manner: Generate, according to a data type of the to-be-transmitted data, a first virtual card of a shape corresponding to the data type, where different data types correspond to different shapes.

Second manner: Generate, according to a data type of the to-be-transmitted data, a first virtual card of a color corresponding to the data type, where different data types correspond to different colors.

Third manner: Generate, according to a data type of the to-be-transmitted data, a virtual card of a shape and a color corresponding to the data type, where different data types correspond to different shapes and different colors.

As for which manner is used to generate a virtual card, it may be determined according to a generation manner that is set on the source device or a manner for generating a protocol between the devices. This is not specifically limited in this embodiment of this application. Certainly, for each type of data, a virtual card in a consistent form may be alternatively generated.

402: The source device sends the data to the target device when detecting a specified operation on the virtual card.

The target device may refer to a device specified by the source device in advance, that is, a device to which a binding relationship is established in advance, or may refer to a device whose distance from the source device is currently within a range. Certainly, if there are multiple devices within the range, the source device may determine target device from the multiple devices according to a direction of the specified operation. In this case, the target device may be a device to which an operation direction of the specified operation is directed.

The specified operation may be any operation, such as a drag operation or a sliding operation, so that a user may perform a simple operation on the virtual card on a screen of the source device by using a finger, to trigger sending of data, so that the source device and the target device perform data transmission preparation work such as establishment of a data transmission connection, and the source device begins to send data to the target device.

Specifically, a case such as a misoperation from occurring, step 402 may further include any one of the following implementations according to different operation types of the specified operation: (1) When a drag operation on the first virtual card is detected, if a distance between a touch point of the drag operation and a screen edge of the source device continuously decreases and the distance is less than a preset distance, the data is sent to the target device. If the drag operation satisfies the foregoing condition, it indicates that a user of the source device is dragging the virtual card to the screen edge, and it may be determined that the user wants to send data, and the data is sent to the target device. (2) When a sliding operation on the first virtual card is detected, if a distance between a touch point of the sliding operation and a screen edge of the source device continuously decreases and a sliding speed is greater than a preset speed, the data is sent to the target device. A principle of the implementation (2) is similar to a principle of the implementation (1), and details are not described herein again.

It is noted that, when detecting the specified operation on the virtual card, the source device may interact with the target device, to establish a data connection between the source device and the target device, so that the source device can send data to the target device by using the data connection.

403: In a data sending process, the source device displays a first moving process, where the first moving process includes a process in which the virtual card moves out of the source device.

Figure 5:
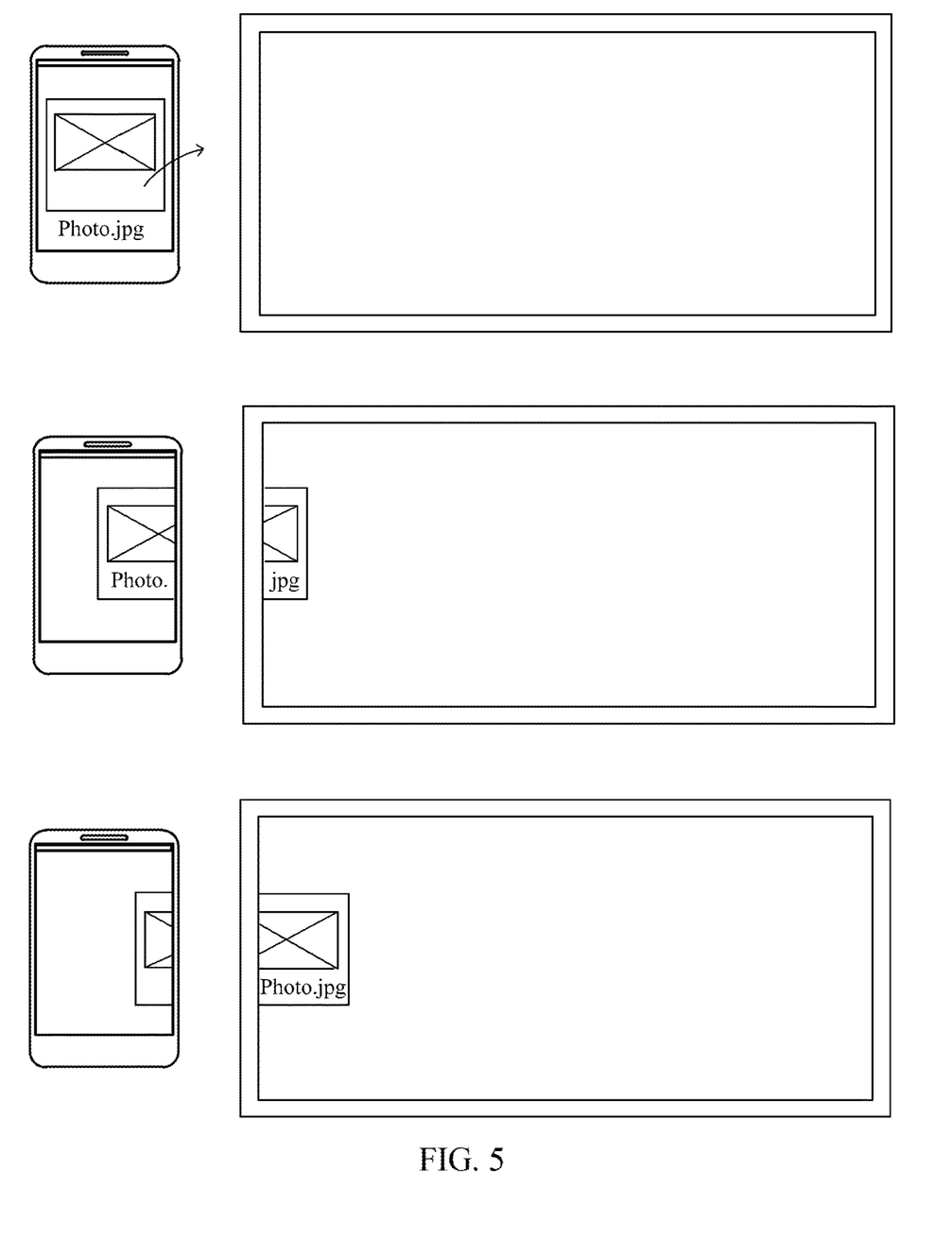
FIG. 5 is a schematic diagram of interface display according to an embodiment of this application.

To intuitively reflect triggering, by a user operation, data sending, in step 403, a moving direction of the virtual card in the first moving process may be determined according to an operation direction of the specified operation. For example, if the operation direction is sliding to the right, the moving direction of the virtual card in the first moving process may be rightward; correspondingly, in a second moving process of a corresponding virtual card in the target device, a moving direction thereof is also correspondingly rightward (as shown in FIG. 5). Certainly, if the operation direction is sliding to the upper right, the moving direction of the virtual card in the first moving process may be toward the upper right, so as to ensure that a displayed moving process is closer to an actual operation.

Further, the first moving process and the second moving process jointly reflect a process in which the virtual card flies out of the source device and flies into the target device. Therefore, when a virtual card of a piece of data is displayed, display of the two devices is complementary to each other, that is, when a first portion of the virtual card is displayed in the source device, the target device displays a second portion of the virtual card, where a sum of the first portion and the second portion is the entire virtual card.

In this embodiment of this application, the descriptions are provided by using an example in which to-be-transmitted data is only one piece of data. However, in an actual scenario, the to-be-transmitted data may be multiple pieces of data. The generated virtual card includes multiple virtual cards of the multiple pieces of data. In the data sending process, a moving process in which the multiple virtual cards of the multiple pieces of data move to the target device according to a data sending sequence. Certainly, the multiple virtual cards may have different forms according to different data types.

It is noted that, the first moving process may be synchronous with data sending progress, or may not be synchronous with data sending progress. This is not specifically limited in this embodiment of this application. That the first moving process may be synchronous with data sending progress may mean that a display ratio of the virtual card in the source device is determined according to a data transmission percentage. For example, if currently 50% data has been transmitted, 50% of the virtual card is displayed in the source device. However, if the data connection between the source device and the target device is disconnected, a transmission failure identifier may be displayed on at least one of the source device and the target device. For example, the transmission failure identifier may be a crack image.

404: The target device receives the data sent by the source device.

The receiving in step 404 means that the target device begins to receive the data sent by the source device. A process in which the source device sends the data may be implemented in a manner of sending a data packet.

405: The target device obtains a virtual card of the data.

For the target device, there may be multiple manners of obtaining the virtual card. The virtual card may be obtained by the target device according to the data sent by the source device, or may be obtained according to a data type of the transmitted data. Specifically, any one of the following manners is included: (1) Generate the virtual card of the data according to the data type of the data. When the source device begins to send the data to the target device, a sent data packet carries the data type of the data. Therefore, for the target device, the corresponding virtual card may be generated based on the data type. A specific generation process is similar to the generation process in step 401, and details are not described herein again. (2) Receive virtual card information sent by the source device, and generate the virtual card of the data according to the virtual card information. In this implementation, the target device may not generate a virtual card according to a data type, and the source device may add virtual card information to a data packet. The virtual card information is used for describing a specific display form of the virtual card, such as a color or a shape. The target device generates the virtual card of the data after receiving the virtual card information.

Figure 6:
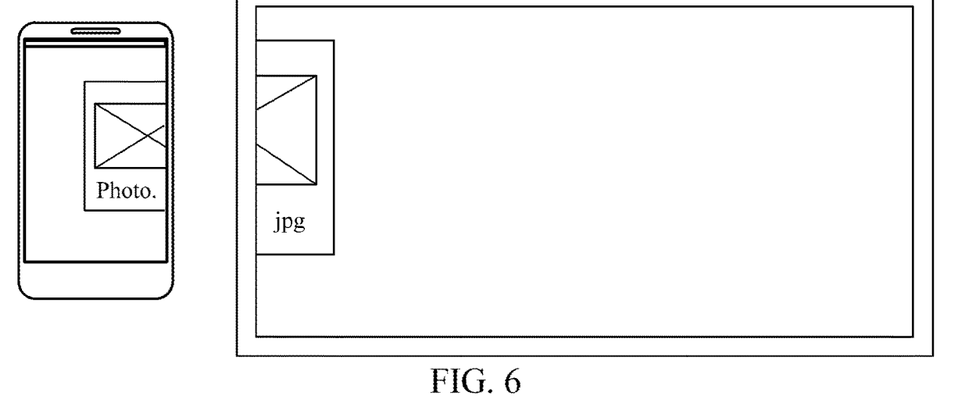
FIG. 6 is a schematic diagram of interface display according to an embodiment of this application.

Further, a display size of the virtual card in the source device may be different from a display size of the virtual card in the target device (as shown in FIG. 6). For example, the target device may generate, according to a size of a screen of the target device, a virtual card whose display size matches the size of the screen, or the target device may generate, according to a virtual card display size preset in the target device, a virtual card whose display size is the same as the preset display size. This is not limited in this embodiment of this application.

For the target device, a virtual card may be displayed by using any one of the foregoing virtual card obtaining manners. This is not specifically limited in this embodiment of this application.

406: In a data receiving process, display a second moving process, where the second moving process includes a process in which a virtual card generated by the target device moves into the target device.

Figure 7:
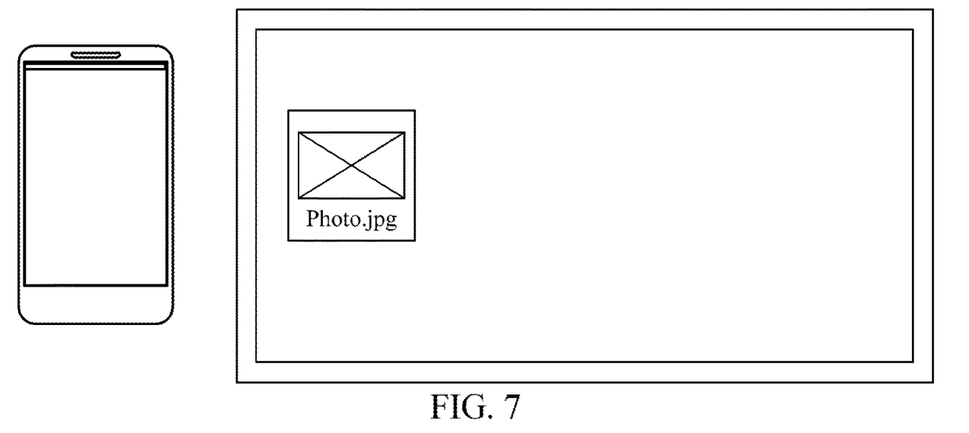
FIG. 7 is a schematic diagram of interface display according to an embodiment of this application.

It is noted that, step 403 and step 406 mean that the source device and the target device cooperate to display a process in which the virtual card generated by the source device moves out of the source device and the virtual card generated by the target device moves into the target device. The moving process not only includes a process in which the virtual card of the source device moves from a specified location on the screen of the source device to an edge of the screen of the source device, and a portion of the virtual card is gradually displayed in an exit manner, until the virtual card completely exits from the screen of the source device, but also includes a process in which the virtual card of the source device gradually enters the screen of the target device in an entry manner from an edge of the screen of the target device, until the virtual card moves to a specified location on the screen of the target device (as shown in FIG. 5 and FIG. 7).

The source device and the target device may implement the foregoing dynamic display in the data transmission process in either of the following manner 1 and manner 2:

Manner 1: When a data transmission connection is established, a master device and a slave device are determined; the master device obtains a virtual screen according to a screen size of the source device and a screen size of the target device, where the virtual screen includes the screen of the source device and the screen of the target device; and the master device determines moving tracks of the virtual cards of the source device and the target device on the virtual screen, thereby controlling the source device and the target device to cooperate to display a moving process in which the virtual card moves from the source device to the target device. In some embodiments, the master device may be used as a target device of a data receiving party. Certainly, the master device may be alternatively selected by the source device and the target device that participate in data transmission. A selection process thereof may be performed according to device performance, currently available computing resources of the devices, and the like. This is not specifically limited in this embodiment of this application.

Manner 2: In the data transmission process, display of a virtual card in two devices is determined based on a moving speed. For example, the virtual card is moved in the source device out of the screen at a specified speed from a specified location along an operation direction of a user, and the virtual card is moved in the target device to a specified location on the screen of the target device from a screen edge at a specified speed. The specified speed may be a preset speed, or may be a speed (such as an average speed or a real-time speed) estimated according to a data transmission speed. This is not specifically limited in this embodiment of this application.

The second moving process displayed in the target device may be represented as different moving directions. Specifically being represented as which moving direction may be determined according to different location relationships between the target device and the source device, thereby displaying a more intuitive moving effect that has continuity. To display this moving effect, a location relationship between the source device and the target device may be determined at any moment when data transmission starts, a connection is initially established, or the target device does not start display; and a moving direction of the virtual card in the second moving process may be determined according to the location relationship, where different location relationships correspond to different moving directions. The location relationship may refer to a location relationship on a plane.

Figure 8:
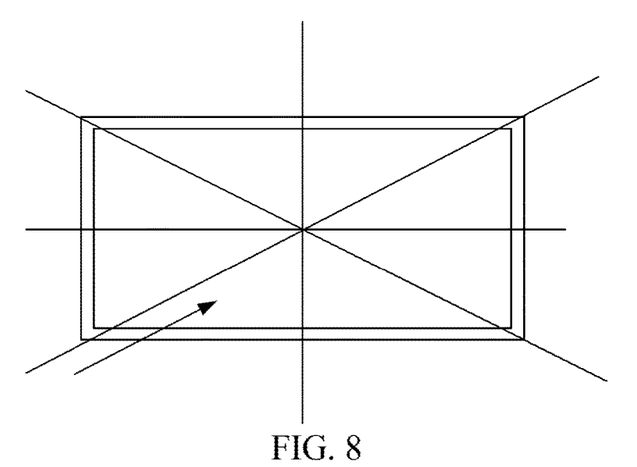
FIG. 8 is a schematic diagram of location relationship assignment according to an embodiment of this application.

It is noted that, the location relationship may be roughly divided into directions shown in FIG. 8, that is, 360 degrees may be evenly or unevenly divided into eight portions on a coordinate axes. For example, the directions are referred to as north, northeast, east, southeast, south, southwest, west, and northwest. If a difference between the location relationship thereof and a direction, such as the southeast direction, is less than a preset threshold, the location relationship is represented on a plane as that the source device is to the southwest of the target device, and then the moving direction may be the moving direction shown by the arrow in FIG. 8.

Certainly, location relationship division or moving direction determining may be the foregoing rough division, or may be precise determining. For example, a moving direction is determined according to an actual location relationship between devices. This is not specifically limited in this embodiment of this application.

Figure 9:
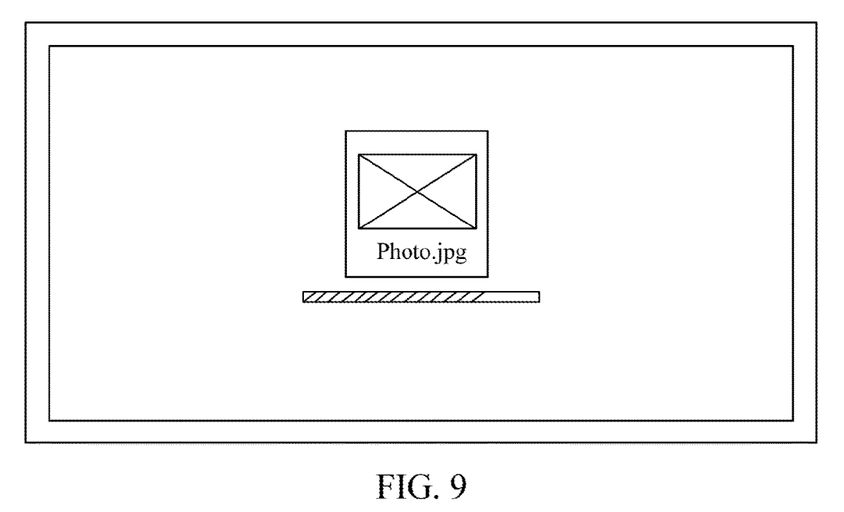
FIG. 9 is a schematic diagram of interface display according to an embodiment of this application.

In another embodiment of this application, for a scenario in which the virtual card is moved in a target device from a screen edge to a specified location on a screen of the target device at a specified speed, the specified speed may be a preset speed, and therefore transmission of the data may not be complete when the virtual card moves to the specified location. Therefore, there may be the following case: if the data is greater than a preset threshold, it is displayed that the virtual card enters a display interface of the target device and moves to the specified location on the display interface of the target device, and the virtual card and real-time transmission progress of the data are displayed at the specified location. As shown in FIG. 9, the real-time transmission progress can veritably reflect a data transmission percentage, or may be only a prompt that data transmission is incomplete, and is not necessarily display determine according to an actual transmission ratio. For example, a progress bar not reaching one hundred percent is always displayed as long as the transmission is incomplete, and a progress bar reaching one hundred percent is displayed once the transmission is complete. The preset threshold may be preset, and this is not specifically limited in this embodiment of this application.

Certainly, for a case in which a speed of transmission between devices is excessively low, it may be first displayed that the virtual card enters the display interface of the target device and moves on the display interface of the target device to a specified location, and then the virtual card and real-time transmission progress of data may be displayed at the specified location, so as to provide more smooth and intuitive transmission experience.

Figure 10:
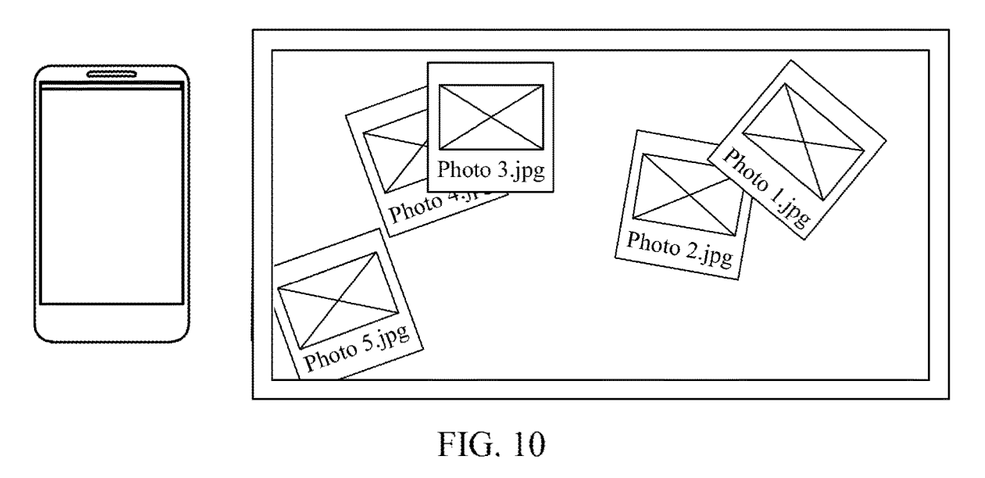
FIG. 10 is a schematic diagram of interface display according to an embodiment of this application.

It is noted that, the foregoing embodiment provides the descriptions by using transmission between one source device and one target device as an example. However, in actual application, multiple source devices may transmit data to one target device, and the data transmission may be parallel transmission, or may be serial transmission. Which source device performs transmission first or later may be determined according to a priority of the source device or a time sequence in which the source device establishes a data connection. Therefore, for the target device, when the target device begins to receive data sent by the multiple source devices, a process in which multiple virtual cards enter a display interface of the target device and move to a specified location on the display interface of the target device is displayed according to a receiving sequence, as shown in FIG. 10. A moving track of each virtual card on a screen of the target device may be in a form of a parabolic curve or a straight line. This is not specifically limited in this embodiment of this application.

This embodiment of this application provides the descriptions by using an example in which the source device is a terminal device and the target device is a vehicle or smartphone device or an in-vehicle device. In actual application, data transmission may be performed by using a vehicle or smartphone device or an in-vehicle device as the source device and a terminal device as the target device. A specific process thereof is similar to the foregoing process, and details are not described herein again.

It is noted that, specific display effects of the first moving process and the second moving process in the foregoing steps may be determined according to at least one of a speed or a force for performing a specified operation in the source device, to simulate a true physical moving effect. Different speeds may correspond to different display effects. For example, a higher speed indicates a higher flying speed of the virtual card. Different forces may correspond to different display effects. For example, a larger force indicates a higher vertex of a flying parabolic curve of the virtual card and a farther point of fall of the virtual card in the target device.

According to the method provided in this embodiment of this application, in a data transmission process, for a source device and a target device, a process in which a virtual card used for representing data flies out of a device is displayed at one end, and a process in which a virtual card enters a device is displayed in a matching and complementation manner at the other end, so that a data transmission process is veritably reflected in a continuous display manner, greatly enhancing intuition of data transmission.

Figure 11:
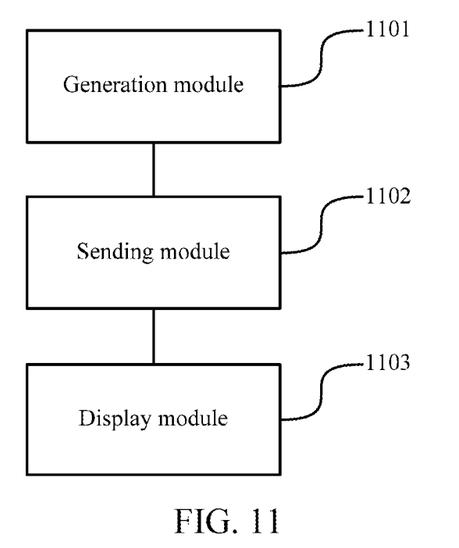
FIG. 11 is a schematic structural diagram of a data transmission apparatus according to an embodiment of this application.

FIG. 11 is a schematic structural diagram of a data transmission apparatus according to an embodiment of this application. The apparatus is applied to a source device. Referring to FIG. 11, the apparatus includes:

a generation module 1101, configured to generate, based on to-be-transmitted data, a first virtual card of the data;

a sending module 1102, configured to send the data to a target device when detecting a specified operation on the first virtual card, the target device generating a second virtual card corresponding to the first virtual card; and a display module 1103, configured to: determine a moving direction of the first virtual card according to an operation direction of the specified operation; and in a data sending process, display a first moving process, the first moving process including a process in which the first virtual card moves out of the source device in the determined moving direction; the target device cooperating with the source device to display a process in which the second virtual card moves into the target device.

In some embodiments, the generation module 1101 is configured to:

generate, according to a data type of the to-be-transmitted data, a first virtual card of a shape corresponding to the data type, where different data types correspond to different shapes; or generate, according to a data type of the to-be-transmitted data, a first virtual card of a color corresponding to the data type, where different data types correspond to different colors; or generate, according to a data type of the to-be-transmitted data, a first virtual card of a shape and a color corresponding to the data type, where different data types correspond to different shapes and different colors.

In some embodiments, the sending module 1102 is configured to:

when detecting a drag operation on the first virtual card, if a distance between a touch point of the drag operation and a screen edge of the source device continuously decreases and the distance is less than a preset distance, send the data to the target device; or when detecting a sliding operation on the first virtual card, if a distance between a touch point of the sliding operation and a screen edge of the source device continuously decreases and a sliding speed is greater than a preset speed, send the data to the target device.

In some embodiments, the display module 1103 is configured to obtain a virtual screen according to screen sizes of the source device and the target device, where the virtual screen includes a screen of the source device and a screen of the target device;

determine moving tracks that are of the first virtual card and the second virtual card and that are on the virtual screen; and display, according to the moving track of the first virtual card, the process in which the first virtual card moves out of the source device, where the target device cooperates with the source device according to the moving track of the second virtual card to display the process in which the second virtual card moves into the target device.

In some embodiments, when the to-be-transmitted data is multiple pieces of data, the generated first virtual card includes multiple first virtual cards of the multiple pieces of data; and correspondingly, the display module 1103 is configured to: in the data sending process, display a process in which the multiple first virtual cards of the multiple pieces of data move out of the source device according to a data sending sequence.

Figure 12:
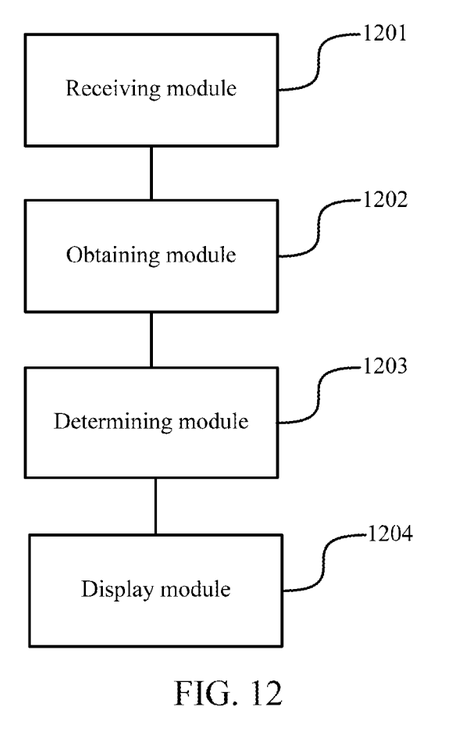
FIG. 12 is a schematic structural diagram of a data transmission apparatus according to an embodiment of this application.

FIG. 12 is a schematic structural diagram of a data transmission apparatus according to an embodiment of this application. The apparatus is applied to a target device. Referring to FIG. 12, the apparatus includes:

a receiving module 1201, configured to receive data sent by a source device, the source device generating a first virtual card for the data;

an obtaining module 1202, configured to obtain a second virtual card that represents the data and corresponds to the first virtual card;

a determining module 1203, configured to determine a location relationship between the source device and the target device; and a display module 1204, configured to: determine a moving direction of the second virtual card according to the location relationship; and in a data receiving process, display a second moving process, the second moving process including a process in which the second virtual card moves into the target device, where the source device cooperates with the target device to display a process in which the first virtual card moves out of the source device.

In some embodiments, the obtaining module 1202 is configured to:

generate the second virtual card of the data according to a data type of the data; or receive virtual card information that is of the first virtual card and that is sent by the source device, and generate the second virtual card of the data according to the virtual card information.

In some embodiments, the display module 1204 is configured to obtain a virtual screen according to screen sizes of the source device and the target device, where the virtual screen includes a screen of the source device and a screen of the target device;

determine moving tracks that are of the first virtual card and the second virtual card and that are on the virtual screen; and display, according to the moving track of the second virtual card, the process in which the second virtual card moves into the target device, where the source device cooperates with the target device according to the moving track of the first virtual card to display the process in which the first virtual card moves out of the source device.

In some embodiments, the display module 1204 is configured to: when receiving data sent by multiple source devices, display, according to a receiving sequence, a process in which multiple second virtual cards move into a display interface of the target device and move to a specified location on the display interface of the target device.

In some embodiments, the display module 1204 is configured to: if an amount of the data is greater than a preset threshold, display that the second virtual card moves into a display interface of the target device and moves to a specified location on the display interface of the target device, and display the second virtual card and real-time transmission progress of data at the specified location.

It is noted that division of the foregoing functional modules is only described for exemplary purposes when the data transmission apparatus provided in the foregoing embodiment performs data transmission. In an actual application, the foregoing functions may be allocated to be accomplished by different functional modules according to requirements, that is, the internal structure of the device is divided into different functional modules, to accomplish all or a part of functions of the above described functions. In addition, the data transmission apparatus provided by the foregoing embodiments are based on the same concept as the data transmission method in the foregoing embodiments. For the specific implementation process, refer to the method embodiments, and the details are not described herein again.

Figure 13:
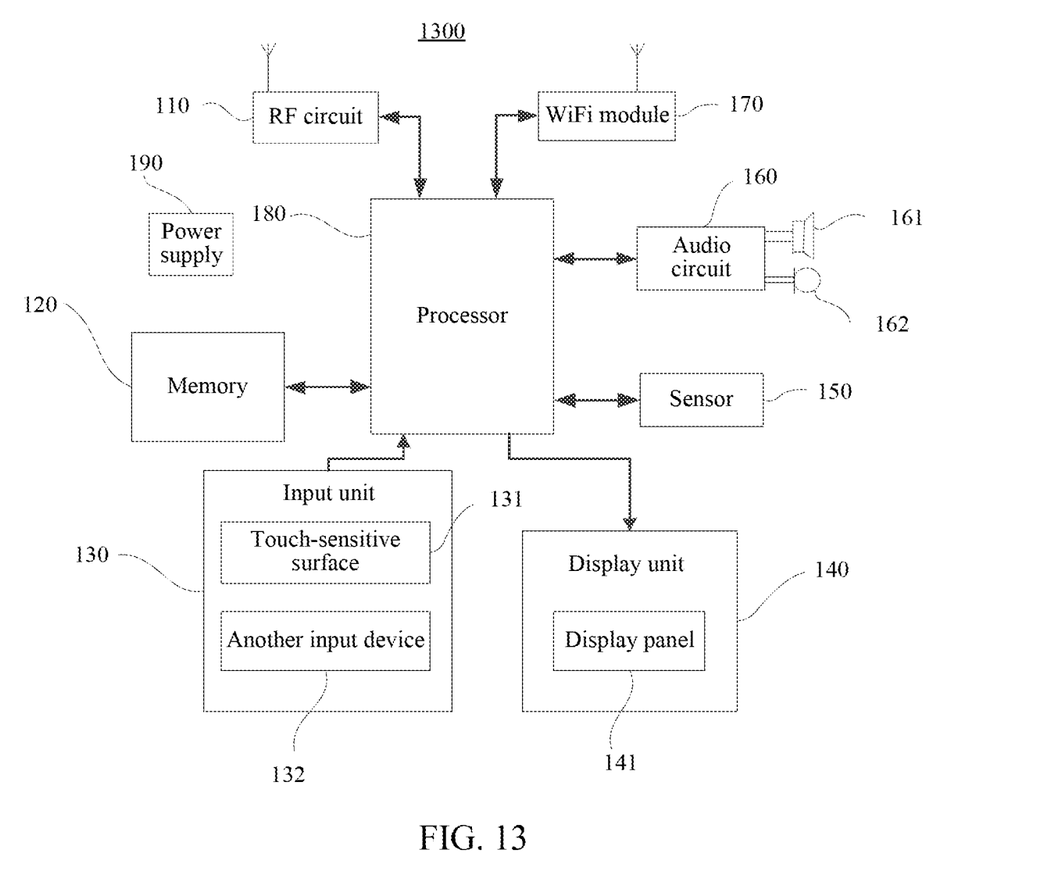
FIG. 13 is a schematic structural diagram of a terminal according to an embodiment of this application.

This embodiment provides a terminal. The terminal may be configured to perform the data transmission method provided in the foregoing embodiments. Referring to FIG. 13, the terminal 1300 includes:

components such as a radio frequency (RF) circuit 110, a memory 120 including one or more computer readable storage media, an input unit 130, a display unit 140, a sensor 150, an audio circuit 160, a WiFi module 170, a processor 180 including one or more processing cores, and a power supply 190. A person skilled in the art may understand that the structure of the terminal shown in FIG. 13 does not constitute a limitation to the terminal, and the terminal may include more or fewer components than those shown in the figure, or some components may be combined, or a different component deployment may be used.

The RF circuit 110 may be configured to receive and send signals during an information receiving and sending process or a call process. Particularly, the RF circuit 110 receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device by wireless communication. The wireless communication may use any communication standard or protocol, including but not limited to Global System for Mobile communications (GSM), general packet radio service (GPRS), Code Division Multiple Access (CDMA), Wideband Code Division Multiple Access (WCDMA), Long Term Evolution (LTE), email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to use of the terminal 1300, and the like. In addition, the memory 120 may include a high speed random access memory, and may also include a non-volatile memory, such as at least one magnetic disk storage device, a flash memory, or another volatile solidstate storage device. Correspondingly, the memory 120 may further include a memory controller, so as to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touch screen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. Moreover, the touch controller can receive and execute a command sent from the processor 180. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 1300. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 13, the touch-sensitive surface 131 and the display panel 141 are used as two separate parts to implement input and output functions, in some embodiments, the touch-sensitive surface 131 and the display panel 141 may be integrated to implement the input and output functions.

The terminal 1300 may further include at least one sensor 150, such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 1300 is moved to the ear. As one type of motion sensor, a gravity acceleration sensor can detect values of accelerations in various directions (generally on three axes), may detect a value and a direction of the gravity when being static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 1300, are not further described herein.

The audio circuit 160, a speaker 161, and a microphone 162 may provide audio interfaces between the user and the terminal 1300. The audio circuit 160 may convert received audio data into an electric signal and transmit the electric signal to the speaker 161. The speaker 161 converts the electric signal into a sound signal for output. On the other hand, the microphone 162 converts a collected sound signal into an electric signal. The audio circuit 160 receives the electric signal and converts the electric signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, so as to provide communication between a peripheral earphone and the terminal 1300.

WiFi is based on a short distance wireless transmission technology. The terminal 1300 may help, by using the WiFi module 170, the user to receive and send e-mails, browse a web page, access streaming media, and so on, which provides wireless broadband Internet access for the user. Although FIG. 13 shows the WiFi module 170, it may be understood that the wireless communications unit is not a necessary component of the terminal 1300, and when required, the wireless communications unit may be omitted as long as the scope of the essence of the present application is not changed.

The processor 180 is a control center of the terminal 1300, is connected to various parts of the entire mobile phone by using various interfaces and lines, and by running or executing a software program and/or module stored in the memory 120, perform various functions of the terminal 1300 and process data, so as to perform overall monitoring on the mobile phone. Optionally, the processor 180 may include one or more processor cores. Preferably, the processor 180 may integrate an application processor and a modem. The application processor mainly processes an operating system, a user interface, an application program, and the like. The modem mainly processes wireless communication. It may be understood that the foregoing modem may either not be integrated into the processor 180.

The terminal 1300 further includes the power supply 190 (such as a battery) for supplying power to the components. Preferably, the power supply may be logically connected to the processor 180 by using a power management system, thereby implementing functions such as charging, discharging and power consumption management by using the power management system. The power supply 190 may further include one or more of a direct current or alternating current power supply, a re-charging system, a power failure detection circuit, a power supply converter or inverter, a power supply state indicator, and any other components.

Although not shown in the figure, the terminal 1300 may further include a camera, a Bluetooth module, and the like, which are not further described herein. Specifically, in this embodiment, the display unit of the terminal is a touch screen display. The terminal further includes a memory and one or more programs. The one or more programs are stored in the memory and configured to be executed by one or more processors. The one or more programs include an instruction that is used for performing an operation performed by the source device in FIG. 2 or FIG. 4.

Figure 14:
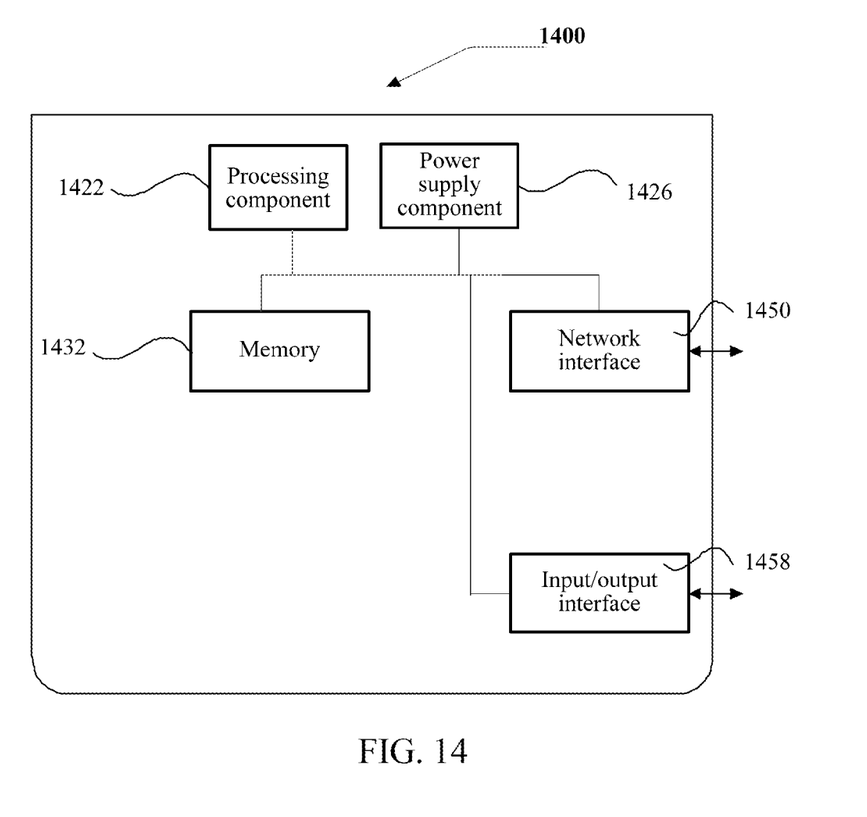
FIG. 14 is a block diagram of a data transmission apparatus 1400 according to an exemplary embodiment.

FIG. 14 is a block diagram of a data transmission apparatus 1400 according to an exemplary embodiment. For example, the apparatus 1400 may be provided as an in-vehicle control device. Referring to FIG. 14, the apparatus 1400 includes a processing component 1422, and the apparatus 1400 further includes one or more processors, and a memory resource represented by a memory 1432. The memory resource is used for storing an instruction that can be executed by the processing component 1422, for example, an application program. An application program stored in the memory 1432 may include one or more modules, where each module corresponds to one group of instructions. In addition, the processing component 1422 is configured as an executable instruction, to perform the data transmission method on a target device side in FIG. 3 or FIG. 4.

The apparatus 1400 may include a power supply component 1426, configured to perform power supply management of the apparatus 1400, a wired or wireless network interface 1450, configured to connect the apparatus 1400 to a network, and an input/output (I/O) interface 1458. The apparatus 1400 may operate an operating system that is stored in the memory 1432, for example, Windows Server™, Mac OS X™, Unix™, Linux™, or FreeBSD™.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a read-only memory, a magnetic disk, an optical disc, or the like.

The foregoing descriptions are merely exemplary embodiments of this application, but are not intended to limit this application. Any modification, equivalent replacement, or improvement made within the spirit and principle of this application shall fall within the protection scope of this application.

What is claimed is:

1. A method for data transmission, comprising:
   generating, by processing circuitry of a source device, a graphical symbol representing data to be transmitted;
   displaying the graphical symbol on a display screen of the source device;
   detecting a touch operation on the graphical symbol that is displayed on the display screen, the touch operation indicating an instruction to transmit the data to a target device, and the touch operation being a sliding operation on the graphical symbol with a touch point sliding at a speed that is greater than a preset speed; and
   in response to and after the touch operation:
      moving the graphical symbol on a virtual screen corresponding to the display screen of the source device and a display screen of the target device to indicate transmission of the data performed in response to the touch operation, wherein the moving the graphical symbol includes moving the graphical symbol across the display screens of the source device and the target device, the moving the graphical symbol following a moving track and having a moving speed, wherein the moving track and the moving speed simulate a physical moving effect of the graphical symbol according to the touch operation such that different speeds for performing the touch operation cause different displayed physical moving effects, and when a user performs the touch operation at a higher speed among the different speeds, the moving speed of the graphical symbol is higher;
      performing the transmission of the data to transmit the data to the target device; and
      displaying a first animation of the graphical symbol leaving the display screen of the source device according to the moving track and the moving speed to indicate the transmission of the data,
   wherein the moving track includes a parabolic curve with a vertex, wherein when the user uses a larger force in applying the touch operation, the larger force causes the vertex of the parabolic curve to be higher and further causes a farther end point of the parabolic curve on the display screen of the target device.

2. The method according to claim 1, wherein the generating the graphical symbol representing the data comprises at least one of:
   generating the graphical symbol with a shape that is indicative of a data type of the data; and
   generating the graphical symbol with a color that is indicative of the data type of the data.

3. The method according to claim 1, further comprising:
   transmitting a signal to the target device to cause the target device to cooperate with the source device and display a second animation of the graphical symbol entering the display screen of the target device according to the moving track and the moving speed.

4. The method according to claim 1, wherein
   the graphical symbol includes multiple card images respectively corresponding to multiple data pieces in the data, and
   the displaying the first animation of the graphical symbol leaving the display screen of the source device comprises:
      animating the multiple card images to leave the display screen of the source device in a sequence corresponding to a data transmission sequence of the multiple data pieces.

5. The method according to claim 1, wherein the displaying the first animation of the graphical symbol leaving the display screen of the source device further comprises:
   displaying a portion of the graphical symbol on the display screen of the source device, the portion being complementary to a partial display of the graphical symbol on the display screen of the target device.

6. A method for data reception, comprising:
   receiving, by processing circuitry of a target device, data sent by a source device in response to a touch operation performed at a source device, the touch operation indicating an instruction to transmit the data from the source device to the target device, the touch operation being a sliding operation on a first graphical symbol on a display screen of the source device with a touch point sliding at a speed that is greater than a preset speed; and
   in response to and after the touch operation:
      obtaining a second graphical symbol representing the data;
      determining a location relationship between the source device and the target device;
      moving the first graphical symbol and the second graphical symbol across the display screen of the source device and a display screen of the target device, respectively;
      determining a moving track and a moving speed for moving the second graphical symbol on the display screen of the target device to indicate reception of the data performed in response to the touch operation, wherein the moving of the first and second graphical symbols has the moving speed and follows the moving track, the moving track and the moving speed simulating a physical moving effect of the second graphical symbol according to the location relationship and the touch operation performed on the first graphical symbol such that different speeds for performing the touch operation correspond to different displayed physical moving effects, and when a user performs the touch operation at a higher speed among the different speeds, the moving speed of the first graphical symbol or the second graphical symbol is higher; and animating the second graphical symbol entering the display screen of the target device according to the moving track and the moving speed to indicate the reception of the data, wherein the moving track includes a parabolic curve with a vertex, wherein when the user uses a larger force in applying the touch operation, the larger force causes the vertex of the parabolic curve to be higher and further causes a farther end point of the parabolic curve on the display screen of the target device.

7. The method according to claim 6, wherein the obtaining the second graphical symbol representing the data comprises:
generating the second graphical symbol according to a data type of the data.

8. The method according to claim 6, wherein the obtaining the second graphical symbol representing the data comprises:
receiving symbol information sent by the source device; and
generating the second graphical symbol according to the symbol information.

9. The method according to claim 6, further comprising:
obtaining a virtual screen corresponding to the display screen of the source device and the display screen of the target device; and
determining the moving track of the second graphical symbol according to the virtual screen.

10. The method according to claim 6, further comprising:
receiving data sent by multiple source devices; and
animating multiple graphical symbols entering the display screen of the target device and arriving at a specific location of the display screen of the target device in a display sequence corresponding to a data reception sequence of the data from the multiple source devices.

11. The method according to claim 6, further comprising:
displaying a real-time transmission progress when an amount of the data is greater than a preset threshold.

12. The method according to claim 6, wherein the animating the second graphical symbol entering the display screen of the target device further comprises:
displaying a portion of the second graphical symbol on the display screen of the target device, the portion being complementary to a partial display of the first graphical symbol on the display screen of the source device.

13. A system, comprising:
interface circuitry configured to display images on a display screen and detect operations on the images;
transmitting circuitry configured to transmit signals; and
processing circuitry configured to:
generate a graphical symbol representing data to be transmitted;
display the graphical symbol on the display screen via the interface circuitry;
detect a touch operation on the graphical symbol via the interface circuitry, the touch operation indicating an instruction to transmit the data to a target device, and the touch operation being a sliding operation on the graphical symbol with a touch point sliding at a speed that is greater than a preset speed; and
in response to and after the touch operation:
move the graphical symbol on a virtual screen corresponding to the display screen and a target display screen of the target device to indicate transmission of the data performed in response to the touch operation, wherein the moving the graphical symbol includes moving the graphical symbol across the display screen and the target display screen of the target device, the moving the graphical symbol following a moving track and having a moving speed, wherein the moving track and the moving speed simulate a physical moving effect of the graphical symbol according to the touch operation such that different speeds for performing the touch operation cause different displayed physical moving effects, and when a user performs the touch operation at a higher speed among the different speeds, the moving speed of the graphical symbol is higher;
perform the transmission of the data to transmit the data to the target device via the transmitting circuitry; and
display a first animation of the graphical symbol leaving the display screen according to the moving track and the moving speed to indicate transmission of the data wherein the moving track includes a parabolic curve with a vertex, wherein when the user uses a larger force in applying the touch operation, the larger force causes the vertex of the parabolic curve to be higher and further causes a farther end point of the parabolic curve on the target display screen of the target device.

14. The system according to claim 13, wherein the processing circuitry is configured to:
generate the graphical symbol with at least one of a shape and a color being indicative of a data type of the data.

15. The system according to claim 13, wherein the processing circuitry is configured to:
transmit, via the transmitting circuitry, a signal to the target device to cause the target device to cooperate with the system and display a second animation of the graphical symbol entering the target display screen of the target device according to the moving track and the moving speed.

16. The system according to claim 13, wherein
the graphical symbol includes multiple card images respectively corresponding to multiple data pieces in the data, and
the processing circuitry is configured to:
display the first animation that includes animating the multiple card images leaving the display screen in a sequence corresponding to a data transmission sequence of the multiple data pieces.

17. The system according to claim 13, wherein the processing circuitry is configured to:
display the first animation that includes displaying a portion of the graphical symbol on the display screen, the portion being complementary to a partial display of the graphical symbol on the target display screen of the target device.

* * * * *